United States Patent [19]
Beirne

[11] 4,245,214
[45] Jan. 13, 1981

[54] SWITCHING MATRIX

[75] Inventor: Patrick R. Beirne, Stittsville, Canada

[73] Assignee: Mitel Corporation, Kanata, Canada

[21] Appl. No.: 46,346

[22] Filed: Jun. 7, 1979

[30] Foreign Application Priority Data

Mar. 29, 1979 [CA] Canada ................................ 324425

[51] Int. Cl.³ ............................................ H04Q 9/00
[52] U.S. Cl. ........................... 340/166 R; 179/18.6 F; 340/147
[58] Field of Search ...................... 340/166 R, 147 C; 178/18.6 F

[56] References Cited
U.S. PATENT DOCUMENTS 3,358,269  12/1967  Benes ............................. 340/166 R
3,399,380  8/1968  Spandorfer ..................... 179/18.6 F
4,093,828  6/1978  Baudin ............................ 179/18.6 F Primary Examiner—Donald J. Yusko
Attorney, Agent, or Firm—Laff, Whitesel & Rockman

[57] ABSTRACT

A non-blocking switching network which has considerably fewer crosspoint switches than would otherwise be expected. The network is comprised of a primary stage having n inputs and m outputs, a plurality of secondary stages each having m inputs and $p_1, p_2, \ldots p_p$ outputs, output $m_x$ being connected via switching crosspoints to all of the outputs $p_x$, $p_{(x+1)}$ and $p_{(x+3)}$, where x is an integral number of the $m^{th}$ output from 1 to m/2, output $m_y$ being dedicated and connected via switching crosspoints to all of the outputs of the $y^{th}$ secondary stage, where y = an integral number from m/2+1 to m.

10 Claims, 2 Drawing Figures

SWITCHING MATRIX

BACKGROUND

This invention relates to the field of switching, and particularly to a non-blocking switching network which has an unexpectedly low number of crosspoint switches and can be used to replace selector switch banks in a step-by-step telephone switching office.

The cost of a space division switching matrix is largely dependent on the number of crosspoints required to switch input sources (inputs) to destinations (outputs). A crossbar switch, for instance, utilizes a number of crosspoint switches which is equal to the number of inputs multiplied by the number of outputs. For an equal number of inputs and outputs n, the number of crosspoint switches is $n^2$. Clearly as the number of inputs and outputs increases, the number of crosspoints increases disproportionately. For a large number of inputs and outputs the size of the crossbar switch would not be economic, and crosspoint switch reducing schemes have been designed, some in which certain degrees of blocking were tolerated.

Networks have been designed to provide interconnection between large numbers of inputs and outputs, with a smaller number of crosspoints than would otherwise be required by the determination noted above. As described in SCIENTIFIC AMERICAN, Volume 238 No. 6, dated June 1978 in an article on COMPLEXITY THEORY by Nicholas Pippenger, page 114 ff., a more efficient design was discovered in the 1950's by Charles Clos of Bell Laboratories. In Clos's design a network that can handle up to n calls at the same time, without blocking, can be constructed with about $6n^{1.5}$ crosspoint switches. It appears that when n is 36 or greater, the number of switches is always less than $n^2$.

The same article in Scientific American notes that L. A. Bassalygo and M. S. Pinsker of the INSTITUTE FOR PROBLEMS OF INFORMATION TRANSMISSION, in Moscow determined that theoretically sparse crossbars can be built to provide networks with fewer switches than the network designed by Clos. The networks proposed by Bassalygo and Pinsker suggests that for a K-by-K subnetwork, only 12 K switches are required, whereas in a normal crossbar subnetwork $K^2$ switches are required. Unfortunately, while Bassalygo and Pinsker theoretically showed that such networks are possible, they did not describe any structural embodiments by which the theory could be realized in practice.

Sparse crossbars are crossbar switches in which a number of crosspoints have been removed, yet which do not affect the blocking probability of the network.

The Scientific American article notes that there are some solutions to the Bassalygo and Pinsker proposals which will not work, and that indeed it would take an impossibly long time to test all solutions and determine which are blocking to what certain degree and which are not.

The present invention, on the other hand, is a switching subnetwork which may be used in place of a crossbar switch, or in place of a selector switch in a step-by-step telephone switching network, which is non-blocking, yet which utilizes a substantially reduced number of switches than might otherwise be expected. For example, in a network having ten inputs to be switched to 100 outputs, a normal crossbar switch would require 1,000 crosspoints, yet the present invention requires only 600. Clearly the cost of such subnetworks is substantially reduced.

SUMMARY OF THE INVENTION

In general the invention is a switching network comprising m inputs and p outputs, input $m_x$ being connected via individual switching corresponds to all of the outputs $p_x$, $P_{(x+1)}$ and $p_{(x+3)}$, where x is an integral number of the $m^{th}$ output from 1 to m−1, output m being dedicated and connected via switching crosspoints to all of the outputs of said secondary stage.

In its basic form, the present switching network is comprised of a primary stage having n inputs and m outputs, a secondary stage having m inputs and $P_1$, $P_2$ ... $P_p$ outputs, the output $m_x$ being connected via switching crosspoints to all of the outputs $p_x$, $p_{(x+1)}$ and $P_{(x+3)}$, where x is an integral number of the $m^{th}$ output from 1 to (m−1), output m being dedicated and connected via switching components to all of the outputs of the secondary stage.

More particularly, the inventive switching network is comprised of a primary stage having n inputs and m outputs, a plurality of secondary stages, each having m inputs and p outputs, the outputs of each secondary stage being connected individually via switching crosspoints to a corresponding number of the m outputs of the primary stage in common with corresponding outputs of all of the other secondary stages, all of the outputs of individual secondary stages being connected via switching crosspoints to corresponding individual dedicated ones of the m outputs.

In the preferred embodiment, the inventive switching network is comprised of a primary stage having n inputs and m outputs, a plurality of secondary stages each having m inputs and $p_1$, $p_2$ ... $p_p$ outputs, output $m_x$ being connected via switching crosspoints to all of the outputs $p_x$, $p_{(x+1)}$ and $p_{(x+3)}$, where x is an integral number of the $m^{th}$ output from 1 to m/2, with output $m_y$ being connected via switching crosspoints to all of the outputs of the $y^{th}$ secondary stage, where y equals an integral number from (m/2+1).

A better understanding of the invention will be obtained by reference to the detailed description below, and to the following drawings, in which.

Figure 1:
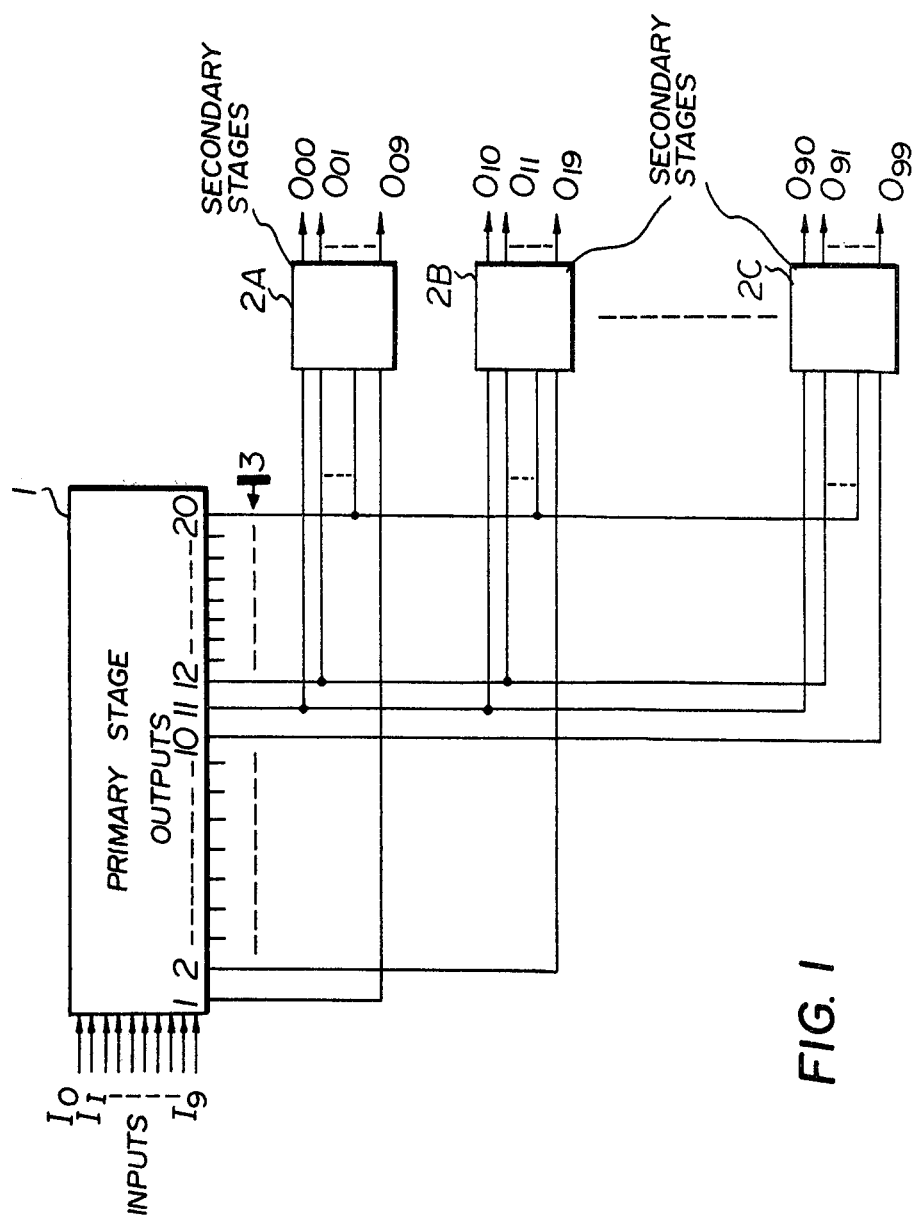
FIG. 1 is a block diagram of the invention.

Turning first to FIG. 1, the invention is shown in block diagram. FIG. 1 depicts a switching network in which 10 inputs are to be connected to 100 outputs. The inputs are labelled $I_0$, $I_1$ ... $I_9$, while the outputs are labelled $O_{00}$, $O_{01}$ ... $O_{99}$. In the preferred embodiment in which the invention is used as a selector switch, the outputs are grouped into 10 groups of 10, i.e. $O_{00}$, $O_{01}$, ... $O_{09}$; $O_{10}$, $O_{11}$ ... $O_{19}$; ... $O_{90}$, $O_{91}$ ... $O_{99}$.

The network is divided into two stages, a primary stage 1, and a plurality of secondary stages 2A, 2B ... 2J.

The primary stage is a full crosspoint switch. In the present embodiment, where there are 10 inputs and 100 outputs divided into 10 groups of 10 outputs, the primary stage has 20 outputs. Accordingly there will be 20×10 or 200 crosspoints in the primary stage.

Junctors 3 are connected to the outputs of the primary stage as follows. One half of the junctors are connected in multiple to corresponding ones of each of the 10 inputs of each secondary stage. For instance, outputs 00, 10, 20 ... 90 (as well as others to be described later)

are connected to the eleventh junctor as well as others connected to a corresponding input of each of the secondary stages. The corresponding outputs of each stage are connected to the same junctors. Outputs 01, 11, 21, . . . 91 are all connected via switches to the twelfth junctor (and others). In other words, corresponding outputs of each secondary stage are connected to the same junctors via crosspoint switches.

In addition, each of the remaining outputs of the primary stage are connected to junctors which are individually dedicated to individual secondary stages. For instance, the first junctor connects output 1 of primary stage 1 to the first secondary stage 2A, the second junctor connects the second output of primary stage 1 to secondary stage 2B, and so on, with output 10 of primary stage 1 being connected via the tenth junctor to secondary stage 2J.

Within each of the secondary stages, the dedicated junctors are connected via switching crosspoints to all of the 10 outputs. In addition, predetermined outputs of each secondary stage are connected individually via switching crosspoints to a corresponding junctor in common with those corresponding outputs of all of the other secondary stages.

Figure 2:
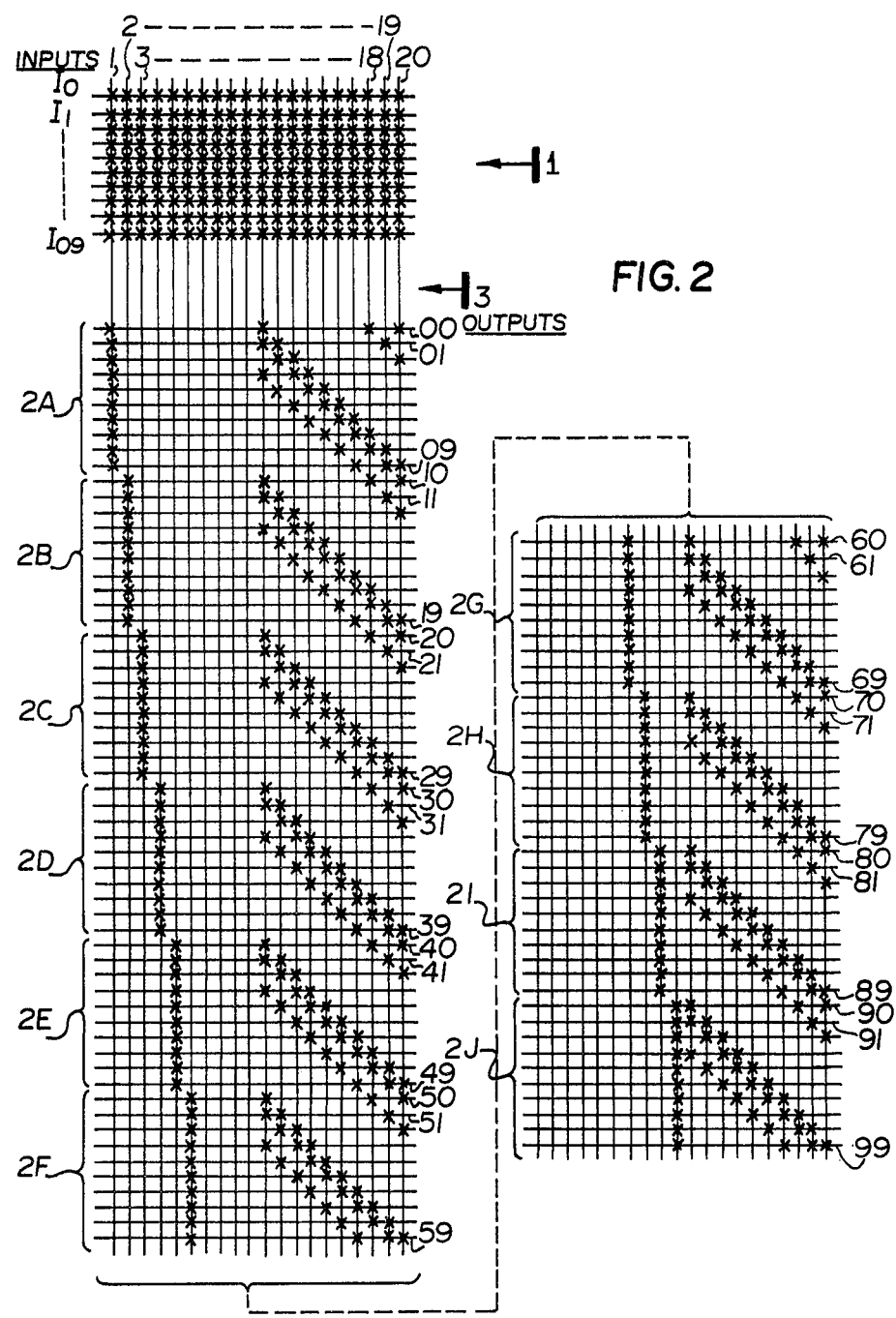
FIG. 2 is a schematic of the invention.

Turning now for reference to FIG. 2, the scheme by which the outputs of the secondary stages are connected to the junctors interconnecting outputs 10-20 of the primary stage to the inputs of the secondary stages is as follows. The first, second and fourth outputs are connected to the eleventh junctor; the second, third and fifth outputs are connected to the twelfth junctor, and so on; the seventh, eighth, and tenth outputs are connected to the seventeenth junctor; the eighth, ninth, and first outputs are connected to the eighteenth junctor; the ninth, tenth, and second outputs are connected to the nineteenth junctor; and the tenth, first, and third outputs are connected to the twentieth junctor. Each output of each of the secondary stages is similarly connected to the corresponding junctors as noted above.

The primary stage 1 is shown with inputs $I_0$–$I_9$ and outputs 1-20. The inputs are shown as conductors in horizontal rows which intersect vertical conductor columns representing the outputs. At each intersection an "x" is shown, representing a crosspoint switch.

It will be recognized that in this embodiment the primary stage appears as a 10×20 terminal crossbar, with 200 cross points.

Junctors 3 connect the outputs 1-20 of the primary stage to the 20 inputs of each of the 10 secondary stages. The corresponding inputs of each of the secondary stages are connected in multiple.

Each of the stages is shown for the purposes of clarity as 2A, 2B, . . . 2J. The outputs of the secondary stages are shown as 00-99, 100 in all.

It will be seen that all of the outpts 00-09 of secondary stage 2A are connected via crosspoints to the junctor connected to output 1 of primary stage 1. Similarly, all of the outputs 10-19 of secondary stage 2B are connected to the junctor connected to output 2 of primary stage 1. In a similar manner the remaining outputs of each of the stages 2C-2J are connected via crosspoints and junctors to outputs 3-10 of the primary stage.

In addition, the first, second and fourth outputs of all of the secondary stages are connected via crosspoints and a junctor to output 11 of the primary stage; the second, third, and fifth outputs of the secondary stages are connected via crosspoints and a junctor to output 12 of the primary stage, etc., as shown.

In general, for the primary stage having n inputs and m outputs, and a plurality of secondary stages each having m inputs and outputs $p_1, p_2 \ldots p_p$, the output $m_x$ is connected via switching crosspoints to all of the outputs $p_x$, $p_{(x+1)}$ and $p_{(x+3)}$, where x is an integral number of the $m^{th}$ output from 1 to m/2. Further, the output $m_y$ is dedicated and is connected via switching crosspoints to all of the outputs of the $y^{th}$ secondary stage, where y is an integral number from $(m/2+1)$ to m.

It may be seen that where there are 10 inputs and 10 groups of ten outputs, the number of crosspoints in the primary stage is 200 and the number of crosspoints in the secondary stages total 400. This is a considerably smaller number and therefore is considerably more economic than a crosspoint switch with 10 inputs and 100 outputs which would require 1000 crosspoints, or a network with 1897 crosspoints as would be required by Clos.

Of course, it will be understood that each crosspoint would usually require a pair of switches for a pair of wires, or in a telephone switching system where this switch is used as a selector it should include three switches operated simultaneously, one each for a tip, ring and sleeve lead. Testing of a ground on the sleeve lead can be effected by ancillary equipment not part of this invention which determines the busy or idle state of the crosspoint.

It should be noted that while the present embodiment is directed to a structure having a secondary stage having outputs grouped into 10 groups of 10, the invention is not limited thereto. For instance, for 100 outputs there could have been 5 groups of 20 outputs, 4 groups of 25, 1 group of 100, etc. All such networks are nonblocking, providing the principles of the present invention are used. In the present case in which 10 groups of 10 outputs are described, each of the rows of outputs numbered with similar last digits are connected to the same destination, allowing the structure to be used as a selector switch in a step-by-step telephone switching system.

In general, the secondary stage can be comprised of a switching network comprising m inputs and p outputs, input $m_x$ being connected via individual switching crosspoints to all of the outputs $p_x$, $p_{(x+1)}$ and $p_{(x+3)}$, where x is an integral number of the $m^{th}$ output from 1 to m/2, input $m_y$ being dedicated and connected via individual switching crosspoints to $(1/y)_j$ of all of the outputs, where j is an integral number from $(m/2+1)$ to m.

Indeed, the secondary switching network can be comprised of m inputs and p outputs, input $m_x$ being connected via individual switching crosspoints to all of the outputs $p_x$, $p_{(x+1)}$ and $p_{(x+3)}$, where x is an integral number of the $m^{th}$ output from 1 to m−1, output m being dedicated and connected via switching crosspoints to all of the outputs of said secondary stage.

In operation, crosspoint switches controlled by an external control in a manner known by persons skilled in the art are closed at 2 crosspoints, one in the primary network and one in the secondary network. For instance, where primary stage input $I_1$ is to be connected to output 01, a crosspoint is closed in the $I_1$ row of the primary network which is connected to either the first, eleventh, twelfth, or nineteenth primary stage output. Each of these primary stage outputs is connected to a junctor which is further connected to corresponding column inputs in the secondary network stage which carry crosspoint switches to the 01 output row of the first secondary network. It may be seen that a plurality of alternative paths are present. The crosspoint switches which are chosen will of course be determined by which are idle, a map of which would be stored in the switch control system.

The described network can of course be used to build up large general non-blocking networks as would be used in a telephone central switching office.

It would be intructive to consider a potential blocking situation, to show how the system would avoid it.

Consider the presence of 20 junctors as shown, which have access to switching crosspoints as described. In the following table, each column designates a junctor connection (totalling 20), and each dual digit number represents first a secondary stage group number (0–9) followed by a secondary stage output number (0–9). The designation "X" means any number from 0 to 9. The numbers above the line in the table designate potentially closed crosspoint switches, as examination thereof will show.

For example junctor 33 designates the fourth group of ten outputs and the fourth output of that group.

TABLE

| OX | 1X | 2X | 3X | 4X | 5X | 6X | 7X | 8X | 9X | X0 | X1 | X2 | X3 | X4 | X5 | X6 | X7 | X8 | X9 |
|----|----|----|----|----|----|----|----|----|----|----|----|----|----|----|----|----|----|----|----|
|    |    |    |    |    |    |    |    |    |    | X1 | X2 | X3 | X4 | X5 | X6 | X7 | X8 | X9 | X0 |
|    |    |    |    |    |    |    |    |    |    | X3 | X4 | X5 | X6 | X7 | X8 | X9 | X0 | X1 | X2 |
| 00 | 10 | 20 |    |    |    |    |    |    |    | 01 | 02 | 12 |    |    |    |    | 11 |    |    |
| 00 | 10 | 20 |    |    |    |    |    |    |    | 01 |    | 12 |    |    |    |    | 11 |    | 02 |
| 00 | 10 | 20 |    |    |    |    |    |    |    | 01 | 21 | 12 |    |    |    |    | 11 |    | 02 |

Let us assume that the crosspoints of group 0, row 0, (00); group 1, row 0, (10); and group 2, row 0 (20); group 0, row 1, (01); group 0, row 2, (02); group 1, row 2, (12); and group 1, row 1 (11) are busy. These designations are shown as the first row below the line in the table. The junctors which have been allocated and are thus busy are the first three, and the eleventh, twelfth, thirteenth and nineteenth. It will be noted that those junctors have been allocated since they carry either the group or row number of the output which must be used, and which lead to the same destination.

Assume now that a call must be routed to destination 21. It will be seen that there are no junctors available which have either a 2 in the first column or a 1 in the second column, i.e., that lead to the second stage or the first output in a stage. The switch controller, in sensing this potential blocking situation, scans its memory to determine which of the already existing paths should be moved. Clearly output 02 can be moved from the twelfth junctor to the twentieth since the third row of crosspoints has an idle crosspoint connected to the twentieth junctor. The change is shown in the second row below the line in the table.

The switches in the secondary stage connected to the twentieth junctor and output row 02 are closed before the switches carrying the call connected to the twelfth junctor are opened, providing a momentary parallel path. The switches in the twelfth junctor are then opened. Accordingly there will be no notice by the parties to the call in progress that a change of junctors and crosspoints has occurred.

Once the transfer has occurred, the call to output 21 is connected and switched via the twelfth junctor as shown in the third row below the line in the table. In this manner calls are routed through the system in a non-blocking manner.

It may now become obvious to a person skilled in the art understanding this invention that modifications or other embodiments may be made utilizing the principles of this invention. All are deemed within its sphere and scope, as defined in the claims appended hereto.

I claim:

1. A switching network comprising:
   (a) a primary stage having n inputs each switchable to m outputs,
   (b) a plurality of secondary stages, each having m inputs and p outputs,
   (c) the outputs of each secondary stage being connected individually via switching crosspoints and the m inputs to a corresponding number of the m outputs of said primary stage in common with corresponding outputs of all of the other secondary stages, and
   (d) all of the outputs of individual secondary stages being connected via further switching crosspoints to corresponding further individual dedicated ones of said m outputs.

2. A switching network as defined in claim 1, in which the number of secondary stages is q, and the number of m outputs is equal to p+q.

3. A switching network comprising:
   (a) a primary stage having n inputs each switchable to m outputs,
   (b) a plurality of secondary stages each having m inputs and $p_1, p_2 \ldots p_p$ outputs,
   (c) output $m_x$ being connected via switching crosspoints to all of the outputs $p_x$, $p_{(x+1)}$ and $p_{(x+3)}$, where x is an integral number of the $m^{th}$ output from 1 to m/2,
   (d) output $m_y$ being dedicated and connected via switching crosspoints to all of the outputs of $y^{th}$ secondary stage,
   where y = an integral number from (m/2+1) to m.

4. A switching network as defined in claim 3, in which the number of m outpts is 20, the number of secondary stages is 10, each having 20 inputs and 10 outputs, and the number of crosspoints in said secondary stages is 400.

5. A switching network as defined in claim 4, in which each of the n inputs is connected to each of the m outputs in said primary stage by a switching crosspoint.

6. A switching network as defined in claim 3, 4 or 5, in which each crosspoint is comprised of 3 switches for connection of a tip, ring and sleeve lead.

7. A switching network as defined in claim 3, 4 of 5 in which corresponding inputs of each of the secondary stages are multipled and connected to the outputs of the primary networks via junctors.

8. A switching network comprising m inputs and p outputs, input $m_x$ being connected via individual switching crosspoints to all of the outputs $p_x$, $p_{(x+1)}$ and $p_{(x+3)}$, where x is an integral number of the $m^{th}$ output from 1 to m/2, input $m_y$ being dedicated and connected via individual switching crosspoints to (1/y) of all of the outputs, where y is an integral number from (m/2+1) to m.

9. A switching network comprising m inputs and p outputs, input $m_x$ being connected via individual switching crosspoints to all of the outputs $p_x$, $p_{(x+1)}$ and $p_{(x+3)}$, where x is an integral number of the $m^{th}$ output from 1 to m−1, output m being dedicated and connected via switching crosspoints to all of the outputs of said secondary stage.

10. A switching network comprising:
 (a) a primary stage having n inputs each switchable to m outputs,
 (b) a secondary stage having m inputs and outputs $p_1$, $p_2 \ldots p_p$,
 (c) the output $m_x$ being connected via switching crosspoints to all of the outputs $p_x$, $p_{(x+1)}$ and $p_{(x+3)}$,
  where x is an integral number of the $m^{th}$ output from 1 to (m−1),
 (d) output m being dedicated and connected via switching components to all of the outputs of said secondary stage.

* * * * *

UNITED STATES PATENT AND TRADEMARK OFFICE
CERTIFICATE OF CORRECTION

PATENT NO. : 4,245,214
DATED : January 13, 1981
INVENTOR(S) : PATRICK R. BIERNE

It is certified that error appears in the above-identified patent and that said Letters Patent are hereby corrected as shown below:

Col. 2, Line 7, "corresponds" should be --crosspoints--;

Col. 2, Line 14, "$P_1, P_2..P_p$" should be --$P_1, P_2...P_p$--;

Col. 3, Line 55, "outpts" should be --outputs--;

Col. 6, Line 47, "outpts" should be --outputs--;

Col. 4, Line 47, remove subscript "j";

Col. 4, Line 48, "j" should be --y--.

Signed and Sealed this

Ninth Day of June 1981

[SEAL]

Attest:

RENE D. TEGTMEYER

Attesting Officer     Acting Commissioner of Patents and Trademarks

UNITED STATES PATENT AND TRADEMARK OFFICE
CERTIFICATE OF CORRECTION

PATENT NO. : 4,245,214
DATED : January 13, 1981
INVENTOR(S) : PATRICK R. BIERNE

It is certified that error appears in the above—identified patent and that said Letters Patent is hereby corrected as shown below:

Col. 4, Line 45, change "output" to --input--;

Line 54, change "output" to --input-- (both occurrences).

CLAIM 8

Col. 6, Line 64, change "output" to --input--;

CLAIM 9

Col. 7, Line 4, change "output" to --input--;

Line 5, change "output" to --input--;

Signed and Sealed this

Eighteenth Day of January 1983

[SEAL]

Attest:

GERALD J. MOSSINGHOFF

Attesting Officer    Commissioner of Patents and Trademarks